United States Patent
Rigelsford et al.

(10) Patent No.: US 12,548,807 B2
(45) Date of Patent: Feb. 10, 2026

(54) ACCELERATED ERROR TESTING FOR WIRELESS BATTERY MANAGEMENT SYSTEMS

(71) Applicant: SENSATA TECHNOLOGIES, INC., Attleboro, MA (US)

(72) Inventors: Jonathan M. Rigelsford, Sheffield (GB); Nicolas R. Henriet, Arcon (FR)

( * ) Notice: Subject to any disclaimer, the term of this patent is extended or adjusted under 35 U.S.C. 154(b) by 671 days.

(21) Appl. No.: 17/802,594

(22) PCT Filed: Feb. 16, 2021

(86) PCT No.: PCT/US2021/018180
§ 371 (c)(1),
(2) Date: Aug. 26, 2022

(87) PCT Pub. No.: WO2021/173378
PCT Pub. Date: Sep. 2, 2021

(65) Prior Publication Data
US 2023/0141979 A1 May 11, 2023

Related U.S. Application Data

(60) Provisional application No. 62/983,355, filed on Feb. 28, 2020.

(51) Int. Cl.
*H01M 10/42* (2006.01)
*H04Q 9/00* (2006.01)

(52) U.S. Cl.
CPC .......... *H01M 10/4257* (2013.01); *H04Q 9/00* (2013.01); *H01M 2010/4271* (2013.01);
(Continued)

(58) Field of Classification Search
CPC ..... H01M 10/4257; H01M 2010/4271; H01M 2010/4278; H01M 2220/20; H04Q 9/00;
(Continued)

(56) References Cited

U.S. PATENT DOCUMENTS

2015/0003261 A1* 1/2015 Silverman ............... H04L 1/203
370/252
2016/0295569 A1* 10/2016 Braun .................. H04B 7/0413
(Continued)

FOREIGN PATENT DOCUMENTS

CN 107064801 A * 8/2017
EP 3536542 A1 * 9/2019 ........ H02J 13/00022

OTHER PUBLICATIONS

Bacquet et al., "Radio frequency communications for smart cells in battery pack for electric vehicle", Dec. 17-19, 2014, 2014 IEEE International Electric Vehicle Conference (IEVC), DOI: 10.1109/IEVC.2014.7056120, pp. 1-4 (Year: 2014).*
(Continued)

*Primary Examiner* — Paul H. Masur

(57) ABSTRACT

Methods, apparatuses, and systems for accelerated error testing for wireless battery management systems are disclosed. Embodiments in accordance with the present disclosure are directed to wireless sensor systems, and specifically to wireless battery management systems (BMS) in vehicles. A test system for a BMS provides a plurality of interference test profiles each comprising interference signals for testing the BMS. For each interference test profile, the interference signals are broadcast by the test system during operation of the BMS. The test system samples packets received by the wireless network controller from at least one battery measurement device during the broadcast of the interference signals and determines a packet error rate (PER) of the BMS for the interference test profile.

20 Claims, 13 Drawing Sheets

(52) U.S. Cl.
CPC ..... *H01M 2010/4278* (2013.01); *H01M 2220/20* (2013.01); *H04Q 2209/40* (2013.01)

(58) Field of Classification Search
CPC .. H04Q 2209/40; H04Q 2209/43; Y02E 60/10
See application file for complete search history.

(56) References Cited

U.S. PATENT DOCUMENTS

| | | | | |
|---|---|---|---|---|
| 2018/0167948 A1* | 6/2018 | Egner | ............... | H04W 72/541 |
| 2023/0078545 A1* | 3/2023 | Rigelsford | ........ | H04W 52/0251 |
| | | | | 320/127 |

OTHER PUBLICATIONS

Faika et al., "An Internet of Things (IoT)-Based Network for Dispersed and Decentralized Wireless Battery Management Systems", Jun. 13-15, 2018, 2018 IEEE Transportation Electrification Conference and Expo (ITEC), DOI: 10.1109/ITEC.2018.8450161, pp. 1-5 (Year: 2018).*

Kurt et al., "Design of the Circuitry, Battery Management System, and Wireless Communication of an Electric Vehicle", Jun. 12-15, 2019, 2019 1st Global Power, Energy and Communication Conference (GPECom), DOI: 10.1109/GPECom.2019.8778553, pp. 1-5 (Year: 2019).*

Vishnu et al., "Various Types of Wireless Battery Management System in EV", Feb. 22-23, 2020, 2020 IEEE International Students' Conference on Electrical, Electronics and Computer Science (SCEECS), DOI: 10.1109/SCEECS48394.2020.115, pp. 1-5 (Year: 2020).*

Bansal et al., "Wireless Battery Management System for Electric Vehicles", Dec. 17-19, 2019, IEEE, 2019 IEEE Transportation Electrification Conference (ITEC-India), 10.1109/ITEC-India48457.2019.ITECINDIA2019-83, pp. 1-5 (Year: 2019).*

International Search Report and Written Opinion, PCT/US2021/018180, May 21, 2021, 10 pages.

* cited by examiner

Provide at least one interference profile representing one or more interference signals for testing a battery management system (BMS), wherein the BMS includes a wireless network controller (WNC) and at least one battery module monitoring system (MMS) 802

Broadcast, during a test of the BMS, the one or more interference signals generated from the at least one interference profile 804

Record packet reception data for the WNC during the test 806

Determine a packet error rate (PER) of the WNC for the at least one interference profile during the test 808

FIG. 8

Provide at least one interference profile representing one or more interference signals for testing a battery management system (BMS), wherein the BMS includes a wireless network controller (WNC) and at least one battery module monitoring system (MMS) 802

Broadcast, during a test of the BMS, the one or more interference signals generated from the at least one interference profile 804

Record packet reception data for the WNC during the test 806

Record packet reception data during a first sampling period 902

Adjust the signal power of the one or more interference signals 904

Record packet reception data during a second sampling period 906

Determine a packet error rate (PER) of the WNC for the at least one interference profile during the test 808

Determine a first PER of the WNC for the first sampling period and determining a second PER of the WNC for the second sampling period 908

FIG. 9

Provide at least one interference profile representing one or more interference signals for testing a battery management system (BMS), wherein the BMS includes a wireless network controller (WNC) and at least one battery module monitoring system (MMS) 802

Broadcast, during a test of the BMS, the one or more interference signals generated from the at least one interference profile 804

Record packet reception data for the WNC during the test 806

Record packet reception data during a first sampling period 1002

Adjust the signal power of transmission from the battery MMS to the WNC 1004

Record packet reception data during a second sampling period 1006

Determine a packet error rate (PER) of the WNC for the at least one interference profile during the test 808

Determine a first PER of the WNC for the first sampling period and determining a second PER of the WNC for the second sampling period 1008

FIG. 10

Provide at least one interference profile representing one or more interference signals for testing a battery management system (BMS), wherein the BMS includes a wireless network controller (WNC) and at least one battery module monitoring system (MMS) 802

Broadcast, during a test of the BMS, the one or more interference signals generated from the at least one interference profile 804

Record packet reception data for the WNC during the test 806

Rotate the battery MMS during the test 1102

Determine a packet error rate (PER) of the WNC for the at least one interference profile during the test 808

FIG. 11

Generate the at least one interference profile representing one or more interference signals for testing the BMS 1202

Provide at least one interference profile representing one or more interference signals for testing a battery management system (BMS), wherein the BMS includes a wireless network controller (WNC) and at least one battery module monitoring system (MMS) 802

Broadcast, during a test of the BMS, the one or more interference signals generated from the at least one interference profile 804

Record packet reception data for the WNC during the test 806

Determine a packet error rate (PER) of the WNC for the at least one interference profile during the test 808

FIG. 12

ACCELERATED ERROR TESTING FOR WIRELESS BATTERY MANAGEMENT SYSTEMS

BACKGROUND

Vehicle sensor systems often use wireless communication to facilitate communication between vehicle sensors and control systems. When there is a loss of communication between sensors and control systems, safety measures must be implemented to place the vehicle into a safe operating state, which may include stopping the vehicle, limiting the vehicle acceleration, limiting a maximum speed, and/or other safety precautions. The safe operating state is maintained until the vehicle can be serviced. It is therefore important to be able to determine the reliability of the wireless communication system. If communication has been lost due to a fault with the transmitting device or a hardware failure, then the control system must put the vehicle into a safe operating state until the fault has been repaired during a servicing operation by qualified maintenance personnel. This can be both inconvenient and costly for the vehicle owner. Thus, it is important to minimize data error rates in the wireless communication between the vehicle sensors and control systems. To minimize data error rates, testing of the wireless communication systems and protocols may require substantial effort. For example, obtaining statistically meaningful and repeatable test data is time consuming and challenging. It is therefore advantageous to improve and accelerate error testing of the wireless communication system.

SUMMARY OF INVENTION

Embodiments in accordance with the present disclosure are directed to accelerating error testing of a wireless vehicle sensor system, particularly a battery management system (BMS). A BMS for a vehicle (e.g., automobiles, heavy vehicles, off road vehicles, etc.) includes one or more battery module monitoring systems (MMSs) that measure battery cell voltage and temperature and transmit the measurement data over a wireless link to a wireless network controller (WNC). In turn, the WNC sends the collated cell voltage and temperature data to the vehicle's control unit. If the control unit fails to receive battery cell voltage and temperature data within the system's fault tolerant time interval (FTTI), then the control unit must put the vehicle into a safe operating state. While a wireless communication loss between the battery MMS and the WNC may be due to a hardware failure, the loss may also be due to the presence of an interfering signal or a malicious denial of service (DoS) attack. While data is unavailable and if the FTTI has been exceeded, then the BMS or other vehicle control system must still place the vehicle into a safe operating state. In such a scenario, the fault may be temporary (particularly if the vehicle is moving) and wireless communication between the battery MMS and WNC can be restored after the interfering signal has been removed. This potentially enables full restoration of vehicle function without the inconvenience of a servicing operation. To avoid placing the vehicle in a safe operating state because of an interfering signal, a BMS should be able to maintain wireless communication between the battery MMS and the WNC even in the presence of an interfering signal. To develop a BMS that maintains functionality even in the presence of an interfering signal, the BMS performance must be tested against interfering signals. Accordingly, embodiments in accordance with the present disclosure are directed to accelerated error testing of the BMS, for example, by creating interference profiles for testing the BMS and providing a test system for accelerating the error testing while maintaining statistical significance and measurement repeatability.

In a particular embodiment, a method of accelerated error testing for wireless battery management systems is disclosed that includes providing at least one interference profile representing one or more interference signals for testing a battery management system (BMS), wherein the BMS includes a wireless network controller (WNC) and at least one battery module monitoring system (MMS). The method also includes, broadcasting, during a test of the BMS, the one or more interference signals generated from the at least one interference profile. The method also includes recording packet reception data for the WNC during the test. The method further includes determining a packet error rate (PER) of the WNC for the at least one interference profile during the test. In some implementations, the method also includes generating the at least one interference profile representing one or more interference signals for testing the BMS.

In a particular embodiment, apparatus for accelerated error testing for wireless battery management systems is disclosed that includes a computer processor and a computer memory operatively coupled to the computer processor. In this embodiment, the computer memory has disposed within it computer program instructions that, when executed by the computer processor, cause the apparatus to provide at least one interference profile representing one or more interference signals for testing a battery management system (BMS), wherein the BMS includes a wireless network controller (WNC) and at least one battery module monitoring system (MMS). The instructions also cause the apparatus to broadcast, during a test of the BMS, the one or more interference signals generated from the at least one interference profile. The instructions also cause the apparatus to record packet reception data for the WNC during the test. The instructions additionally cause the apparatus to determine a packet error rate (PER) of the WNC for the at least one interference profile during the test. In some implementations, the apparatus also generates the at least one interference profile representing one or more interference signals for testing the BMS.

In a particular embodiment, a system for accelerated error testing for wireless battery management systems is disclosed that includes a battery management system (BMS). In this embodiment, the BMS includes at least one battery module monitoring system (MMS) configured to transmit battery sensor data over a wireless communication link and a wireless network controller (WNC) configured to receive the battery sensor data from the at least one battery MMS. The system also includes a test unit test unit for testing the BMS, where in the test unit is configured to provide at least one interference profile representing one or more interference signals for testing a battery management system (BMS), wherein the BMS includes a wireless network controller (WNC) and at least one battery module monitoring system (MMS). The test unit is also configured to broadcast, during a test of the BMS, the one or more interference signals generated from the at least one interference profile. The test unit is further configured to record packet reception data for the WNC during the test. The test unit is additionally configured to determine a packet error rate (PER) of the WNC for the at least one interference profile during the test.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF DRAWINGS

FIG. 8 sets forth a flow chart illustrating an exemplary method of accelerated error testing for a wireless battery management system in accordance with at least one embodiment of the present disclosure;

FIG. 9 sets forth a flow chart illustrating another exemplary method of accelerated error testing for a wireless battery management system in accordance with at least one embodiment of the present disclosure;

FIG. 10 sets forth a flow chart illustrating another exemplary method of accelerated error testing for a wireless battery management system in accordance with at least one embodiment of the present disclosure;

FIG. 11 sets forth a flow chart illustrating another exemplary method of accelerated error testing for a wireless battery management system in accordance with at least one embodiment of the present disclosure;

FIG. 12 sets forth a flow chart illustrating another exemplary method of accelerated error testing for a wireless battery management system in accordance with at least one embodiment of the present disclosure.

DESCRIPTION OF EMBODIMENTS

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
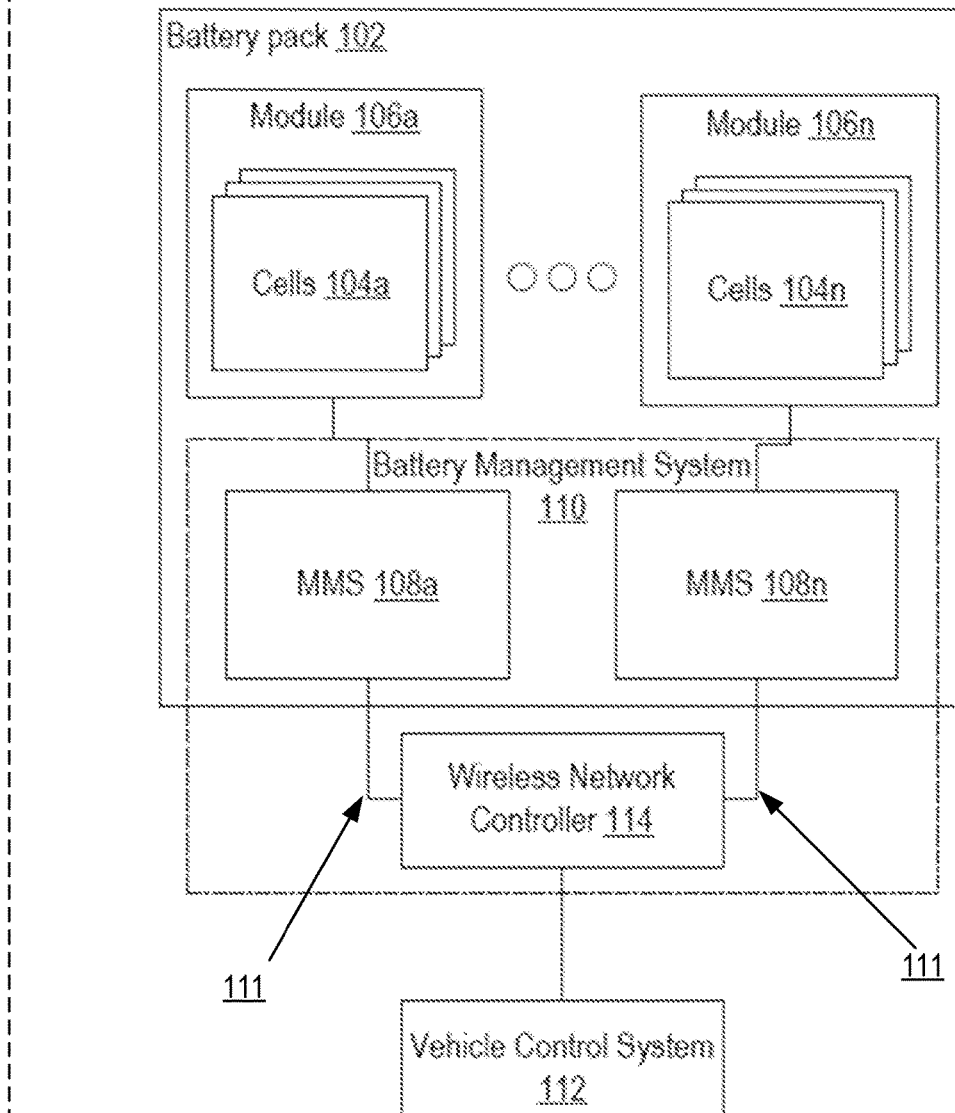
FIG. 1 sets forth a block diagram illustrating a system that includes an exemplary battery management system (BMS) configured for accelerated error testing in accordance with at least one embodiment of the present disclosure.

Exemplary methods, apparatus, systems, and non-transitory computer program products for accelerated error testing for wireless battery management systems in accordance with the present disclosure are described with reference to the accompanying drawings, beginning with FIG. 1. FIG. 1 sets forth a block diagram of a system configured for accelerated error testing for a wireless battery management system according to at least one embodiment of the present disclosure. The system includes a battery pack (102), such as a high voltage battery for use in an electric vehicle (101). The battery pack (102) includes a plurality of cells (104a-n), such as Lithium-ion (Li-ion) cells. The cells (104a-n) are grouped into modules (106a-n) such that each module (106a-n) comprises a corresponding subset of the cells (104a-n). The cells (104a-n) may be physically grouped into modules (106a-n) using a casing, chassis, or other enclosure. The cells (104a-n) may also be logically grouped into modules (106a-n) by virtue of distinct groupings of cells (104a-n) being monitored by a distinct module monitoring system (108a-n), as will be described below.

The system also includes a battery management system (110). The battery management system (110) monitors various attributes of the cells (104a-n) and provides battery sensor data indicating these attributes to a vehicle control system (112). The battery management system (110) includes a plurality of module monitoring systems (MMS) (108a-n). Each MMS (108a-n) is configured to monitor a corresponding module (106a-n) of cells (104a-n). For example, each module (106a-n) may have a MMS (108a-n) attached to a chassis, base, tray, or other mechanism holding the cells (104a-n) of the module (106a-n). Each MMS (108a-n) includes sensors to measure various attributes of the cells (104a-n) of its corresponding module (106a-n). Such attributes may include voltage, current, temperature, and potentially other attributes. The attributes are indicated in battery sensor data generated by the MMS (108a-n).

Each MMS (108a-n) encodes its battery sensor data for transmission as a wireless signal and transmits its battery sensor data to a wireless network controller (WNC) (114) over a radio frequency (RF) link (111) (e.g., a 2.4 Ghz wireless channel). The WNC (114) and battery MMSs (108a-n) each include an RF transceiver for communication over the RF link (111). The WNC (114) then sends the battery sensor data received from the MMSs (108a-n) to a vehicle control system (VCS) (112) using a wired or wireless communications channel. The VCS (112) may include a central "computer" of a vehicle. The VCS (112) may be a central control unit or may refer collectively to one or more vehicle subsystems.

The BMS (110) may support various standard communication protocols within the Industrial, Science and Medical (ISM) frequency bands, such as IEEE 802.11a/b/g/n (i.e., Wi-Fi and wireless local area network in the 2.4 GHz band), IEEE 802.11ac (Wi-Fi and wireless local area network in the 5 GHz band), 802.15.1 (Bluetooth/Bluetooth Low Energy and wireless personal area networks in the 2.4 GHz band), WAP (Wireless Access Protocol), and other protocols that will occur to those of skill in the art. In a particular embodiment, the BMS (110) uses a non-standard communication protocol in the 2.4 GHz band for communication between the MMSs (108a-n) and the WNC (114). When developing a non-standard communication protocol (e.g., a propriety protocol), it is important to test the protocol in the presence of competing protocol transmissions. Further, the testing of a communication protocol within a BMS presents unique challenges that are different from the testing of other communication in other devices and wireless networks. For example, a battery MMS is typically located in a battery pack with many other battery MMSs and the battery pack is typically separated from the WNC by vehicle structure (e.g., a bulkhead). Moreover, while the vehicle is moving it may pass through transient fields of interference. These and other conditions make the testing of a BMS more difficult when compared to conventional communications testing. The testing techniques disclosed herein provide robust and accelerated testing of a BMS.

The arrangement of components and devices making up the exemplary system illustrated in FIG. 1 are for explanation, not for limitation. Various embodiments of the present disclosure may be implemented on a variety of hardware platforms in addition to those illustrated in FIG. 1.

Figure 2:
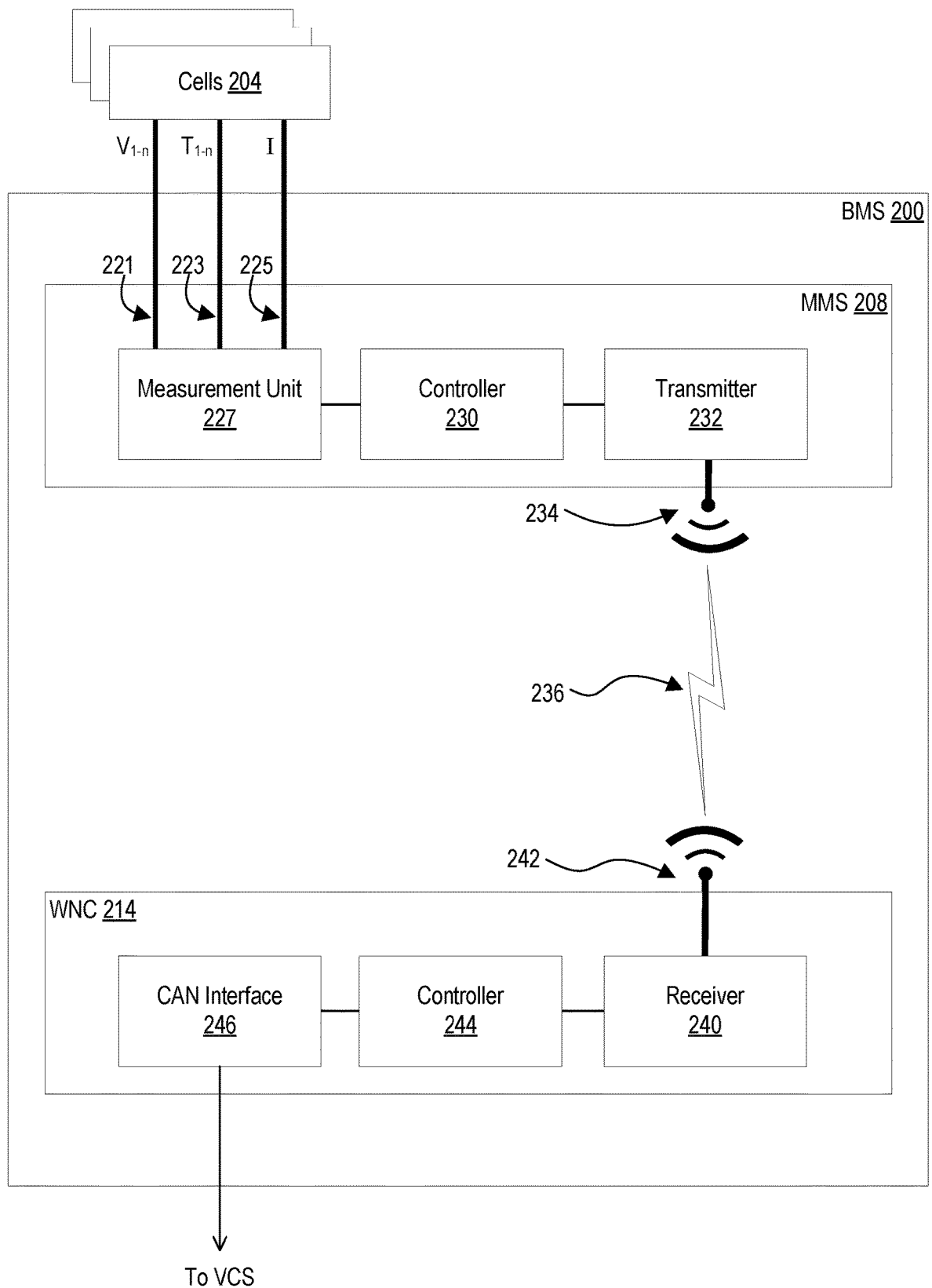
FIG. 2 sets forth a block diagram illustrating another system that includes an exemplary BMS configured for accelerated error testing in accordance with at least one embodiment of the present disclosure.

For further explanation, FIG. 2 sets forth a diagram of a system that includes an example BMS (200) used for accelerated error testing for a wireless battery management system according to at least one embodiment of the present disclosure. The example BMS (200) includes an MMS (208) and a WNC (214) that are used in an electric vehicle and may be configured similarly as the MMSs (108a-n) and WNC (114) in FIG. 1. In the example of FIG. 2, the MMS (208) includes a voltage probe (221) and a temperature probe (223) for each cell (204) (e.g., each of cells 104a in FIG. 1) of a module (e.g., module (106a)). The MMS (208) also includes a current probe (225) for the module. The voltage probes (221), temperature probes (223), and current probe (225) are coupled to a measurement unit (227) that collects voltage, temperature, and current readings from the cells and battery module. In some examples, the measurement unit (227) includes analog to digital converters to convert analog measurements into a digital output that is provided to a controller (230). For example, the measurement unit (227) may be an application specific integrated circuit (ASIC). The controller (230) collects the voltage, temperature, and current data from the measurement unit (227) and encodes the data for transmission to the WNC (214). In one example, the controller (230) may be an ASIC configured to generate packets of battery sensor data from digital measurements of voltage, temperature, and current for cells in a module. In another example, the controller (230) is a processor coupled to a memory device configured with instructions that, when executed by the processor, cause the controller (230) to generate packets of battery sensor data from digital measurements of voltage, temperature, and current for cells in a module. The controller (230) transmits the battery sensor data to the WNC (214) by way of a wireless transmitter (232). The wireless transmitter (232) includes an antenna (234) and other components such as an amplifier, oscillator, modulator, and other components for generating an RF signal transmitted over an RF link (236). In some examples, the antenna (234) is a directional antenna generally oriented toward the WNC (214). In some examples, the wireless transmitter (232) also includes a wireless receiver. For example, the MMS (208) may receive requests for battery sensor data from the WNC In the example of FIG. 2, the WNC (214) includes a wireless receiver (240) that includes an antenna (242) and other components such as an amplifier, tuner, demodulator, and other components for receiving the RF signal over the RF link (236) (e.g., a channel in the 2.4 GHz band). A controller (244) of the WNC (214) receives the packets including the battery sensor data. The controller (244) is coupled to a controller area network (CAN) interface (246) through which the controller (244) transmits the battery sensor data to the VCS. As will be explained in more detail below, external signals may interfere with the RF link (236) causing data (i.e., bits) in the signal to be corrupted or causing a packet to be lost (i.e., not received or partially received). These types of packet errors are measurable by a packet error rate (PER) that is a function of the number of packets received and correctly decoded, and the number of packets that were transmitted or expected to be transmitted. Often, data is encoded as bits with additional bits for error detection and/or correction. This additional information may take the form of, for example, parity bits, checksums, or a cyclic redundancy check (CRC) that enables the receiver to determine if there is a bit error in the data and may also include redundancy information to correct the error such as an error correction code. A packet error may arise upon detecting a bit error when decoding the packet data. Packets are also encoded with metadata information that may indicate the size of the packet, the number of packets in a sequence, a sequence number, a CRC, and so on. From the packet metadata, a corrupted packet may be detected, for example, when the stated size of the packet data payload does not match the actual size of the packet data payload or when a CRC fails. A lost packet may be detected when a packet sequence number is missing from the sequence of received packets. A corrupted or lost packet may also give rise to a packet error.

Figure 3:
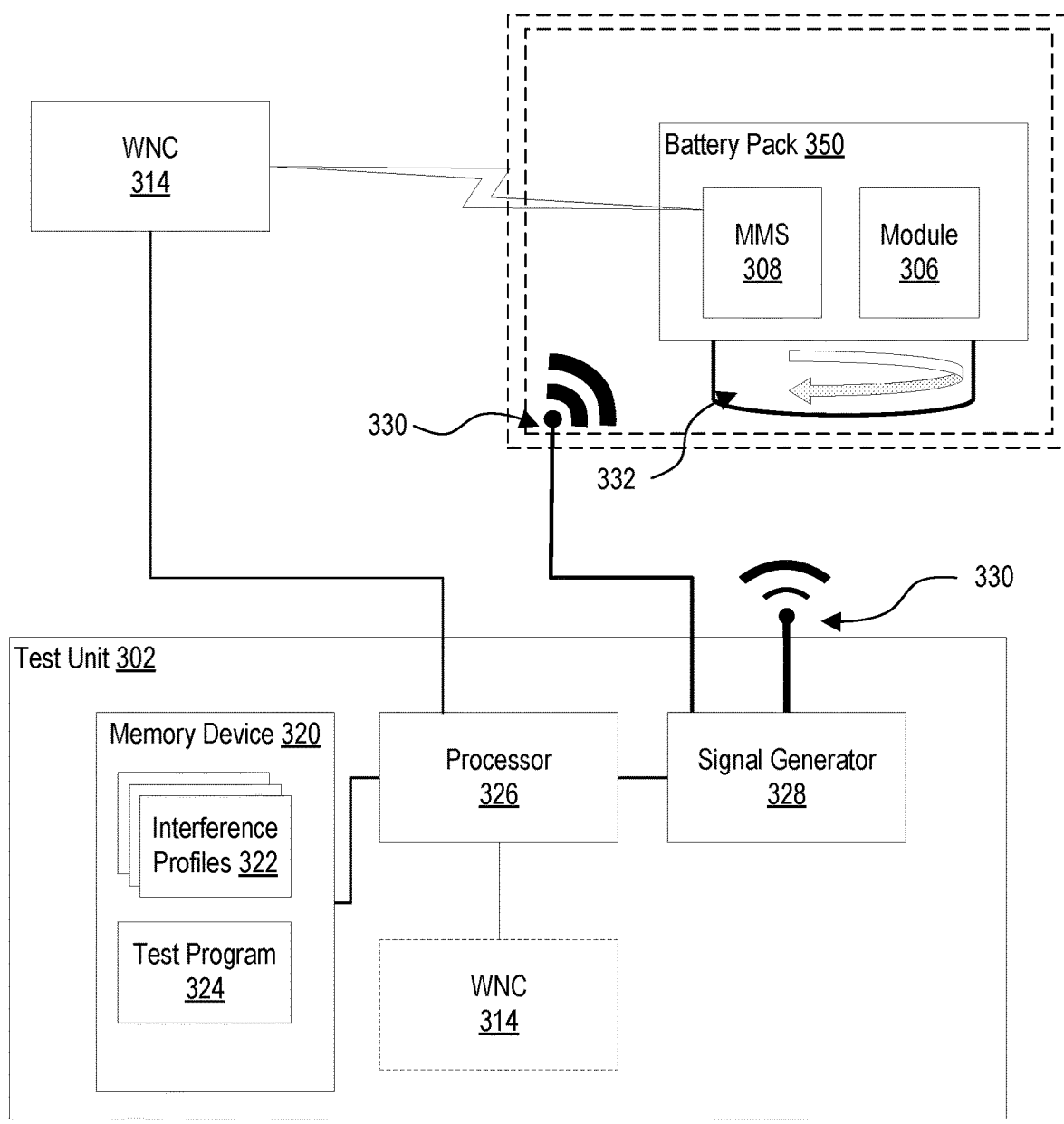
FIG. 3 sets forth a block diagram illustrating an exemplary test system for accelerated error testing of a wireless battery management system in accordance with at least one embodiment of the present disclosure.

For further explanation, FIG. 3 sets forth an example test system (300) for accelerated error testing for a wireless battery management system according to embodiments of the present disclosure. In FIG. 3, the example test system (300) includes a test unit (302) for testing a PER between an MMS (308) and a WNC (314) (e.g., the MMS (208) and WNC (214) of FIG. 2). In various testing environments, the MMS (308) may be coupled to a module (306) within a battery pack (350); or the MMS (308) may be a standalone device under test that is configured to transmit test data. In some examples, the test unit (302) is communicatively couplable to the WNC (314) via direct link or through a wired or wireless network. In other examples, the WNC (314) is integrated within the test unit (302). In a particular example, the WNC (314) is placed at a distance from the MMS (308) that approximates the distance from the WNC to the MMS when implemented in a vehicle. In some implementations, the test unit (302) is couplable to a vehicle CAN bus or VCS to test a BMS within the vehicle. For example, the test unit (302) may acquire packet reception data, values, and statistics for the WNC via the CAN bus or VCS.

In the example of FIG. 3, the test unit (302) includes a memory device (320) that stores one or more interference profiles (322) for testing the PER in the WNC (314). In some examples, an interference profile (322) includes parameters representing one or more interference signals. For example, the parameters may include one or more parameters corresponding to a communications protocol (e.g., Wi-Fi or Bluetooth), a channel, an activity level, and a power level. Each interference profile (322) may also include data for transmission or use randomized data. In some examples, the memory device (320) also stores a test program (324) including processor-executable instructions that, when executed by the processor (326), causes the test unit (302) to create an interference profile using the parameters. In some examples, the test program (324) includes instructions that cause the test unit (302) to simulate one or more interference signals in accordance with one or more interference profiles (322) and output the simulated signals to a signal generator (328). In some examples, an interference profile is created by sampling signals generated by devices in an actual operating environment and creating a spectral frequency and power profile for the signals. The signal generator (328) in the test unit (302) generates one or more interference signals in accordance with one or more interference profiles (322) and broadcasts the one or more interference signals through one or more antennas (330). In some examples, the test program (324) also includes instructions for analyzing packet statistics generated by the WNC (314) such as packets received and packets lost or corrupted. The interference profiles (322) may be developed specifically to disrupt communication between the MMS (308) and the WNF (314) based on characteristics of that communication such as the communication protocol, encoding/decoding schemes and error correction mechanisms, transmit/receive power levels, and physical orientation of the MMS (308) and WNC (314), as well as characteristics of the battery sensor data.

In some examples, the test system (300) also includes a rotatable test platform (332). In order to accelerate testing, the battery pack (350) may be rotated on the rotatable test platform (332) during the testing period to change the angle of the interfering signal(s) with respect to the MMS (308). In some examples, the MMS (308) may be mounted in various representative positions within the battery pack (350) during various sampling intervals while also inverting the orientation of the battery MMS (308) such that the antenna of the MMS (308) is oriented away from the WNC (314). By rotating the battery pack and/or changing the orientation of the MMS, testing is accelerated by making radio propagation of battery sensor data more difficult than under normal conditions. In some examples, the test system (300) also includes a test chamber (340) to isolate the MMS (308). One or more antennas (330) of the test unit (302) may be placed in the test chamber (340) with the MMS (308) to strengthen the effect of the interference signals so as to accelerate testing of the BMS. In some examples, the power of the signal transmitted from the MMS (308) may be increased or decreased during a test period or from one test period to another. In some examples, the receiver sensitivity of the WNC (314) may be increased or decreased during a test period or from one test period to another. In some examples, the strength of the interference signal(s) may be increased during the test period or from one test period to another.

Figure 4:
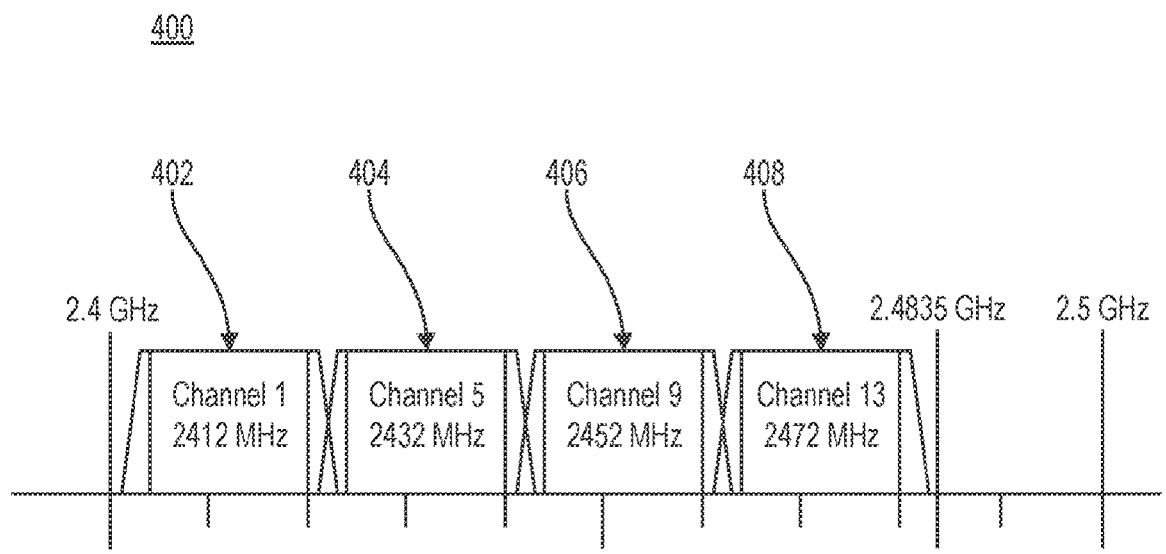
FIG. 4 sets forth a diagram illustrating channels in a 2.4 GHz frequency band.

For further explanation, FIG. 4 depicts an example spectrum (400) of the 802.11g/n (orthogonal frequency-division multiplexing) 2.4 GHz ISM band. The example spectrum includes four non-overlapping channels (402, 404, 406, 408) that are 20 MHz in width, although it will be appreciated that the 2.4 GHz band may include additional channels that partially overlap. The first channel (402) is a 20 MHz wide channel centered on 2412 MHz; the second channel (404) is a 20 MHz wide channel centered on 2432 MHz; the third channel (406) is a 20 MHz wide channel centered on 2452 MHz; and the fourth channel (408) is a 20 MHz wide channel centered on 2472 MHz. The portion of the spectrum between 2.4835 GHz and 2.5 GHz is reserved for the subcarrier. The example spectrum (400) will be used as a reference herein when referring to 2.4 GHz channels.

Figure 5:
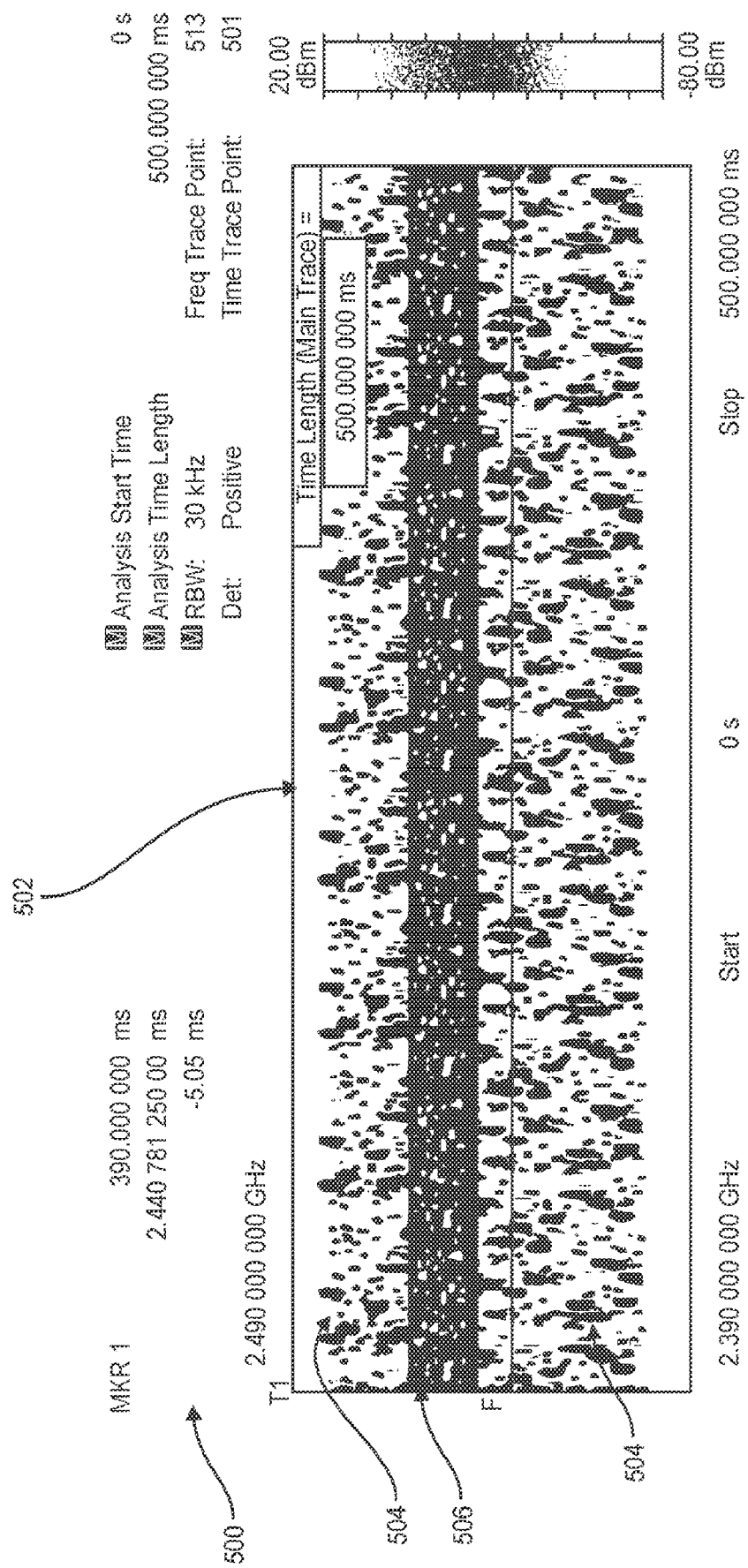
FIG. 5 sets forth an example interference profile for accelerated error testing for a wireless battery management system in accordance with at least one embodiment of the present disclosure.

For further explanation, FIG. 5 depicts a screenshot (500) of a spectrum analyzer representing an interference profile (502) for accelerated error testing for wireless battery management systems in accordance with the present disclosure. In the interference profile (502) captured in the screenshot (500), frequency ranging from 2.39 GHz to 2.49 GHz is the y-axis and time from 0 to 500 milliseconds is on the x-axis. The interference profile (502) simulates the signals from eight Bluetooth devices and one Wi-Fi channel (i.e., the third channel (406) from FIG. 4) operating at 100% activity. The emulated Bluetooth devices use short bursts (504) of data in a random frequency hopping pattern at a level of activity higher than would be normally expected from, for example, a Bluetooth headset of speakers or other consumer devices. The emulated Wi-Fi device uses a signal (506) that fills an entire channel at 100% activity. Thus, the interference profile (502) acts as a competing protocol to the BMS wireless communication in that the BMS has to tolerate the bursty interference and have a mechanism for avoiding the broad Wi-Fi interference such as frequency blacklisting.

Figure 6:
FIG. 6 sets forth another example interference profile for accelerated error testing for a wireless battery management system in accordance with at least one embodiment of the present disclosure.

For further explanation, FIG. 6 depicts a screenshot (600) of a spectrum analyzer representing an interference profile (602) for accelerated error testing for wireless battery management systems in accordance with the present disclosure. In the interference profile (602) captured in the screenshot (600), frequency ranging from 2.39 GHz to 2.49 GHz is the y-axis and time from 0 to 500 milliseconds is on the x-axis. The interference profile (602) represents a 2.4 GHz Wi-Fi signal that is fully bonded (e.g., occupying the four non-overlapping channels (402, 404, 406, 408) in FIG. 4) and operating at 30% activity. In the interference profile (602), each channel (604, 606, 608, 610) is intermittently active for varying amount of time. Such an interference pattern is challenging to overcome using a blacklisting technique as the entire 2.4 GHz band is occupied by interfering signals and the duration of activity in each channel is relatively short. The screenshot (600) also includes a graph (612) of power (y-axis) vs. time (x-axis) for the interference signal profile (602).

Figure 7:
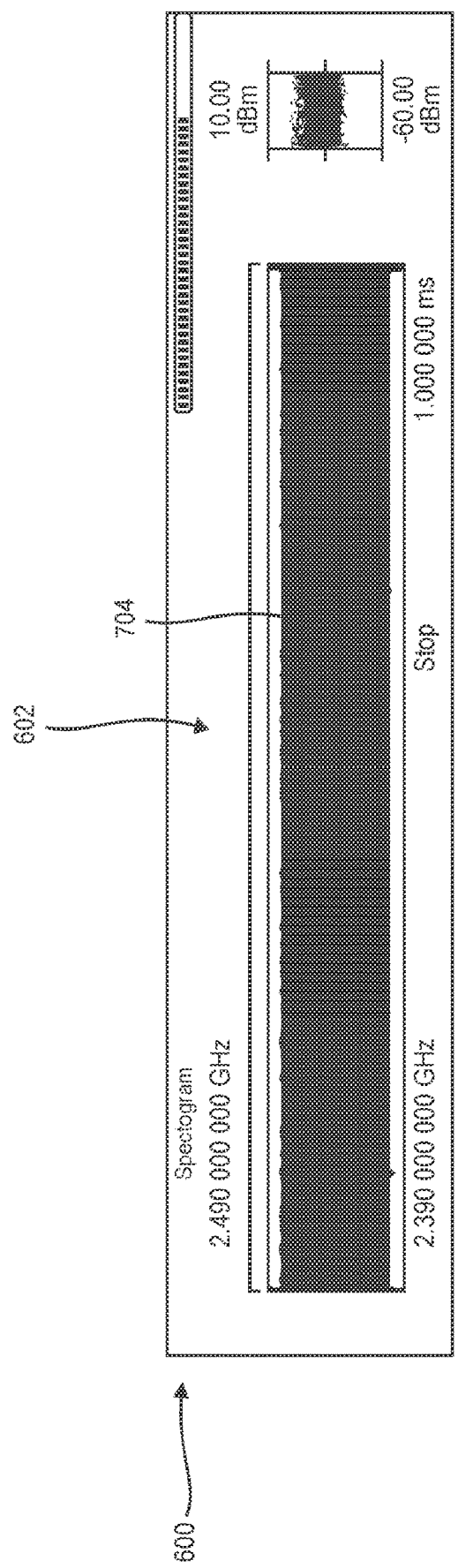
FIG. 7 sets forth another example interference profile for accelerated error testing for a wireless battery management system in accordance with at least one embodiment of the present disclosure.

For further explanation, FIG. 7 depicts a screenshot (700) of a spectrum analyzer representing an interference profile (702) for accelerated error testing for wireless battery management systems in accordance with the present disclosure.

In the interference profile (702) captured in the screenshot (700), frequency ranging from 2.39 GHz to 2.49 GHz is the y-axis and time from 0 to 1 millisecond is on the x-axis. The interference profile (702) represents a 100 MHz wide jamming signal (704) covering the entire 2.4 GHz band. Such an interference profile is useful and robust in testing against malicious denial of service attacks where the interfering signal exceeds the 2.4 GHz bandwidth and at power levels that are much higher than legally permitted.

For further explanation, FIG. 8 sets forth a flow chart illustrating an exemplary method of accelerated error testing for a wireless battery management system according to at least one embodiment of the present disclosure that includes providing (802) at least one interference profile representing one or more interference signals for testing a battery management system (BMS), wherein the BMS includes a wireless network controller (WNC) and at least one battery module monitoring system (MMS). In some examples, providing (802) at least one interference profile representing one or more interference signals for testing a battery management system (BMS), wherein the BMS includes a wireless network controller (WNC) and at least one battery module monitoring system (MMS) is carried out by storing one or more interference profiles (e.g., interference profiles (322) in FIG. 3) in a test unit (e.g., test unit (302) in FIG. 3). For example, the test unit includes or is countable to a WNC (e.g., WNC (314) of FIG. 3) of a BMS. The BMS includes the WNC and one or more battery MMSs (e.g., MMS (308) of FIG. 3). The interference profile includes data for emulating one or more interference signals that may be used to test a communications link between the WNC and the battery MMS. For example, the interference profile may include data to emulate signals in the 2.4 GHz band that could be emitted from consumer electronics devices or other devices that use a protocol that competes with a protocol used by the BMS. For example, the interference profiles may include data to emulate signals in accordance with a standards-based protocol such as Bluetooth or Wi-Fi. Here, "standards-based protocol" means a protocol specified by a body or organization such as the IEEE or Bluetooth Special Interest Group; whereas the BMS may use protocols not specified by a body or organization and may be a proprietary protocol.

The method of FIG. 8 also includes broadcasting (804), during a test of the BMS, the one or more interference signals generated from the at least one interference profile. In some examples, broadcasting (804), during a test, the one or more interference signals generated from the at least one interference profile is carried out by a signal generator (e.g., the signal generator (328) of FIG. 3) generating one or more interference signals based on the interference profile(s). The one or more interference signals are broadcast so to intentionally interfere with communication between the battery MMS and the WNC, and therefore to test the performance of a communication link between the battery MMS and the WNC. The one or more interference signals may be broadcast during a specified testing period of a predetermined length of time.

The method of FIG. 8 also includes recording (806) packet reception data for the WNC during the test. In some examples, recording (806) packet reception data for the WNC during the test is carried out by noting values associated with packet reception, packet loss, packet corruption, packet truncation, and the like. In some implementations, the WNC records such values and provides those values to the test unit. In other implementations, the test unit monitors such values through a network connection or direct link.

The method of FIG. 8 also includes determining (808) a packet error rate (PER) of the WNC for the at least one interference profile during the test. In some examples, determining (808) a packet error rate (PER) of the WNC for the at least one interference profile during the test is carried out by the test unit calculating a PER from the number of packets transmitted and the number of packets received and decoded. Determining (808) a packet error rate (PER) of the WNC for the at least one interference profile during the test may also be carried out by examining packet sequence numbers and determining whether a packet has been lost based on a missing sequence number. Determining (808) a packet error rate (PER) of the WNC for the at least one interference profile during the test may also be carried out by calculating a PER as a function of a BER. Other techniques for calculating a PER may be used as will occur to those of skill in the art.

For further explanation, FIG. 9 sets forth a flow chart illustrating an exemplary method of accelerated error testing for a wireless battery management system according to at least one embodiment of the present disclosure. Like the method depicted in FIG. 8, the method of FIG. 9 also includes providing (802) at least one interference profile representing one or more interference signals for testing a battery management system (BMS), wherein the BMS includes a wireless network controller (WNC) and at least one battery module monitoring system (MMS); broadcasting (804), during a test of the BMS, the one or more interference signals generated from the at least one interference profile; recording (806) packet reception data for the WNC during the test; and determining (808) a packet error rate (PER) of the WNC for the at least one interference profile during the test.

In the method of FIG. 9, recording (806) packet reception data for the WNC during the test includes recording (902) packet reception data during a first sampling period. In some examples, recording (902) packet reception data during a first sampling period is carried out by extracting values associated with packet reception, packet loss, packet corruption, packet truncation, and the like for a predefined sampling period. For example, these values may be obtained for a period of time while the one or more interference profiles a broadcast at a particular signal power.

In the method of FIG. 9, recording (806) packet reception data for the WNC during the test further includes adjusting (904) the signal power of the one or more interference signals. In some examples, adjusting (904) the signal power of the one or more interference signals is carried out by the signal generator increasing or decreasing the signal output power of the interference signals so at to determine the effect on the PER. Increasing or decreasing the signal output power of the interference signals at the signal generator may be carried out by the test unit as part of executing a test program.

In the method of FIG. 9, recording (806) packet reception data for the WNC during the test further includes recording (906) packet reception data during a second sampling period. In some examples, recording (906) packet reception data during a second sampling period is carried out by extracting values associated with packet reception, packet loss, packet corruption, packet truncation, and the like for a predefined sampling period. For example, these values may be obtained for a period of time after a signal power of the one or more interference has been adjusted.

In the method of FIG. 9, determining (808) a packet error rate (PER) of the WNC for the at least one interference profile during the test includes determining (908) a PER of the WNC for the first sampling period and determining a PER of the WNC for the second sampling period. The PER for each sampling period may be determined using any of the above-described techniques for PER calculation.

For further explanation, FIG. 10 sets forth a flow chart illustrating an exemplary method of accelerated error testing for a wireless battery management system according to at least one embodiment of the present disclosure. Like the method depicted in FIG. 8, the method of FIG. 10 also includes providing (802) at least one interference profile representing one or more interference signals for testing a battery management system (BMS), wherein the BMS includes a wireless network controller (WNC) and at least one battery module monitoring system (MMS); broadcasting (804), during a test of the BMS, the one or more interference signals generated from the at least one interference profile; recording (806) packet reception data for the WNC during the test; and determining (808) a packet error rate (PER) of the WNC for the at least one interference profile during the test.

In the method of FIG. 10, recording (806) packet reception data for the WNC during the test includes recording (1002) packet reception data during a first sampling period. In some examples, recording (1002) packet reception data during a first sampling period is carried out by extracting values associated with packet reception, packet loss, packet corruption, packet truncation, and the like for a predefined sampling period. For example, these values may be obtained for a period of time while the communication from the battery MMS to the WNC is transmitted at a particular signal power.

In the method of FIG. 10, recording (806) packet reception data for the WNC during the test includes adjusting (1004) the signal power of transmission from the battery MMS to the WNC. In some examples, adjusting (1004) the signal power of transmission from the battery MMS to the WNC is carried out by a transmitter of the battery MMS increasing or decreasing an output power of transmission signals to the WNC so at to determine the effect on the PER. In some implementations, the battery MMS may be in communication with the test unit. In these implementations, increasing or decreasing the signal output power of the transmitter on the battery MMS may be carried out by the test unit as part of executing a test program.

In the method of FIG. 10, recording (806) packet reception data for the WNC during the test further includes recording (1006) packet reception data during a second sampling period. In some examples, recording (1006) packet reception data during a second sampling period is carried out by extracting values associated with packet reception, packet loss, packet corruption, packet truncation, and the like for a predefined sampling period. For example, these values may be obtained for a period of time after the signal power of the transmission from the battery MMS to the WNC has been adjusted.

In the method of FIG. 10, determining (808) a packet error rate (PER) of the WNC for the at least one interference profile during the test includes determining (1008) a PER of the WNC for the first sampling period and determining a PER of the WNC for the second sampling period. The PER for each sampling period may be determined using any of the above-described techniques for PER calculation.

For further explanation, FIG. 11 sets forth a flow chart illustrating an exemplary method of accelerated error testing for a wireless battery management system according to at least one embodiment of the present disclosure. Like the method depicted in FIG. 8, the method of FIG. 11 also includes providing (802) at least one interference profile representing one or more interference signals for testing a battery management system (BMS), wherein the BMS includes a wireless network controller (WNC) and at least one battery module monitoring system (MMS); broadcasting (804), during a test of the BMS, the one or more interference signals generated from the at least one interference profile; recording (806) packet reception data for the WNC during the test; and determining (808) a packet error rate (PER) of the WNC for the at least one interference profile during the test.

In the method of FIG. 11, recording (806) packet reception data for the WNC during the test further includes rotating (1102) the battery MMS during the test. In some examples, rotating (1102) the battery MMS during the test is carried out by rotating a test platform (e.g., test platform (332) in FIG. 3) supporting a battery MMS, either by itself or within a battery pack. Initiating the rotation of the battery MMS during the test period may be carried out by the test unit as part of executing a test program. The battery MMS may be rotated continuously or in increments.

For further explanation, FIG. 12 sets forth a flow chart illustrating an exemplary method of accelerated error testing for a wireless battery management system according to at least one embodiment of the present disclosure. Like the method depicted in FIG. 8, the method of FIG. 12 also includes providing (802) at least one interference profile representing one or more interference signals for testing a battery management system (BMS), wherein the BMS includes a wireless network controller (WNC) and at least one battery module monitoring system (MMS); broadcasting (804), during a test, the one or more interference signals generated from the at least one interference profile; recording (806) packet reception data for the WNC during the test; and determining (808) a packet error rate (PER) of the WNC for the at least one interference profile during the test.

The method of FIG. 12 further includes generating (1202) the at least one interference profile representing one or more interference signals for testing the BMS. In some examples, generating (1202) the at least one interference profile representing one or more interference signals for testing the BMS is carried out by a test program that accepts parameters for simulating one or more interference signals and creates an interference profile based on the parameters. For example, the parameters may include one or more parameters corresponding to a communications protocol (e.g., Wi-Fi or Bluetooth), a channel, an activity level, and a power level. In some examples, an interference profile is created by sampling signals generated by devices in an actual operating environment and creating a spectral frequency and power profile for the signals.

Figure 13:
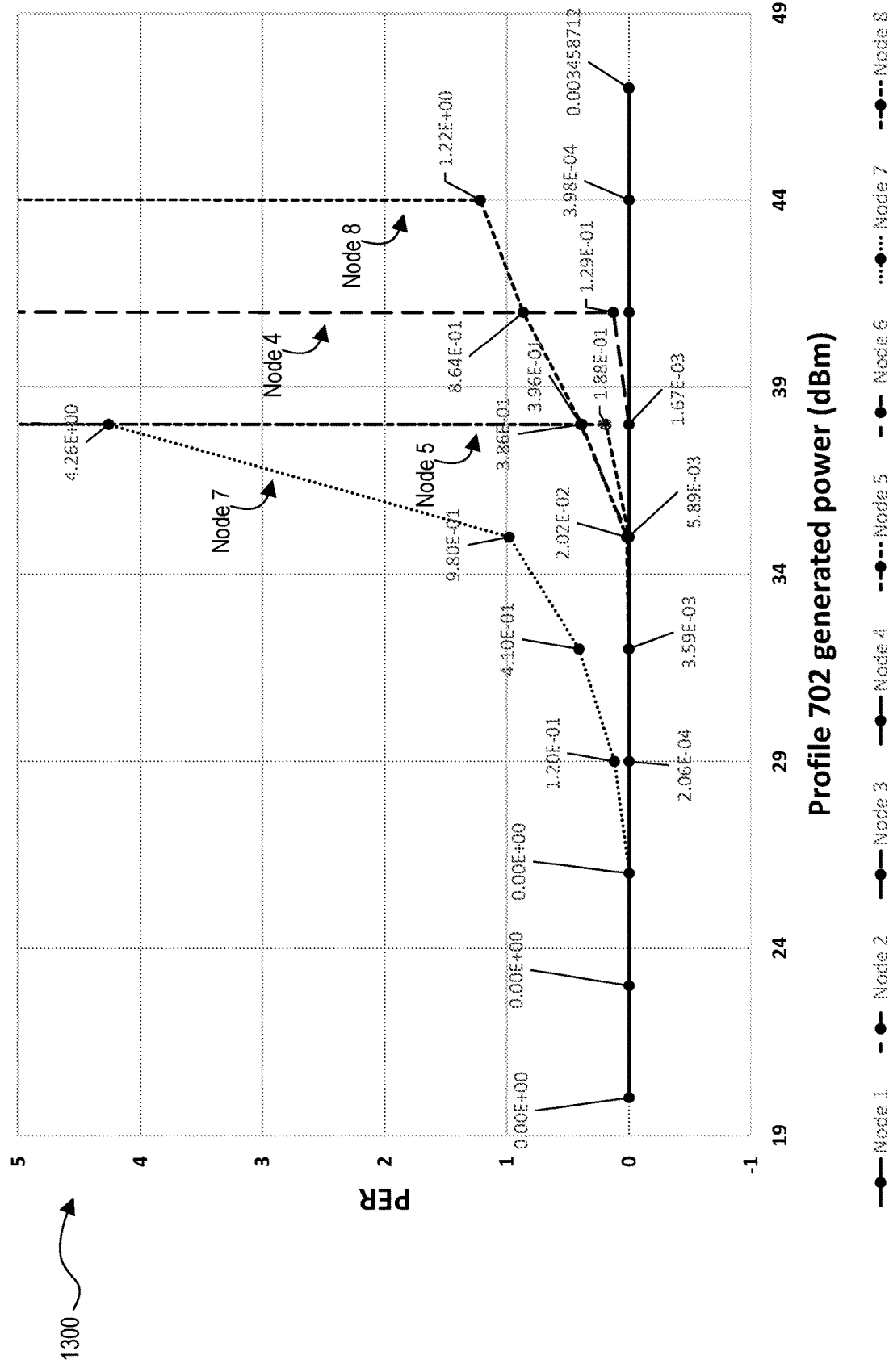
FIG. 13 set forth a graph illustrating example results of packet error rate (PER) testing using accelerated error testing for a wireless battery management system in accordance with at least one embodiment of the present disclosure.

For further explanation, FIG. 13 sets forth a graph (1300) illustrating an exemplary test result utilizing accelerated error testing for wireless battery management systems according to embodiments of the present disclosure. The graph (1300) represents a PER (y-axis) detected in a WNC from multiple battery MMS nodes 1-8 when the interference profile (702) of FIG. 7 is used. As can be seen in the graph, PER is measured against the interference profile (702) with increasing amounts of signal power (x-axis) applied to the interference signals. It can be seen in the graph that nodes 7, 5, 4, and 8 fail completely at a particular signal power in the interference signal, while communication with the remaining nodes remains operable.

In view of the explanations set forth above, readers will recognize that the benefits of accelerated error testing for wireless battery management systems according to embodiments of the present disclosure include an improved testing system for a vehicle wireless sensor system that provides robust test patterns and interference scenarios that reduces the amount of time needed to test the error rate of wireless communication in the sensor system, as well as other benefits that will be appreciated by those of skill in the art.

The exemplary methods of FIGS. 8-12 may be embodied in computer program instructions stored in a memory of the test system that, when executed by a processor of the test system, cause the test system to carry out the method of FIGS. 8-12. Readers of skill in the art will recognize, however, that the present disclosure also may be embodied in a computer program product disposed upon computer readable storage media for use with any suitable data processing system.

Advantages and features of the present disclosure can be further described by the following statements:

1. A method of accelerated error testing for wireless battery management systems, the method comprising: providing at least one interference profile representing one or more interference signals for testing a battery management system (BMS), wherein the BMS includes a wireless network controller (WNC) and at least one battery module monitoring system (MMS); broadcasting, during a test of the BMS, the one or more interference signals generated from the at least one interference profile; recording packet reception data for the WNC during the test; and determining a packet error rate (PER) of the WNC for the at least one interference profile during the test.
2. The method of statement 1 wherein recording packet reception data for the WNC during the test includes: recording packet reception data during a first sampling period; adjusting a signal power of the one or more interference signals; and recording packet reception data during a second sampling period; and wherein determining a PER of the WNC for the at least one interference profile during the test includes determining a first PER of the WNC for the first sampling period and determining a second PER of the WNC for the second sampling period.
3. The method of statements 1 or 2, wherein recording packet reception data for the WNC during the test includes: recording packet reception data during a first sampling period; adjusting a signal power of transmission from the battery MMS to the WNC; and recording packet reception data during a second sampling period; and wherein determining a PER of the WNC for the at least one interference profile during the test includes determining a PER of the WNC for the first sampling period and determining a PER of the WNC for the second sampling period.
4. The method of any of statements 1-3, wherein recording packet reception data for the WNC during the test includes rotating the battery MMS during the test.
5. The method of any of statements 1-4, further comprising generating the at least one interference profile representing one or more interference signals for testing the BMS.
6. The method of any of statements 1-5, where an orientation of the battery MMS within a battery pack is inverted such that an antenna of the battery MMS is oriented away from the WNC.
7. The method of any of statements 1-6, wherein the at least one interference profile emulates a standard wireless communication protocol, and wherein the battery MMS and WNC utilize a non-standard wireless communication protocol.
8. An apparatus for accelerated error testing for wireless battery management systems, the apparatus comprising a computer processor, a computer memory operatively coupled to the computer processor, the computer memory having disposed within it computer program instructions that, when executed by the computer processor, cause the apparatus to: provide at least one interference profile representing one or more interference signals for testing a battery management system (BMS), wherein the BMS includes a wireless network controller (WNC) and at least one battery module monitoring system (MMS); broadcast, during a test of the BMS, the one or more interference signals generated from the at least one interference profile; record packet reception data for the WNC during the test; and determine a packet error rate (PER) of the WNC for the at least one interference profile during the test.
9. The apparatus of statement 8, wherein recording packet reception data for the WNC during the test includes: recording packet reception data during a first sampling period; adjusting a signal power of the one or more interference signals; and recording packet reception data during a second sampling period; and wherein determining a PER of the WNC for the at least one interference profile during the test includes determining a first PER of the WNC for the first sampling period and determining a second PER of the WNC for the second sampling period.
10. The apparatus of statements 8 or 9, wherein recording packet reception data for the WNC during the test includes: recording packet reception data during a first sampling period; adjusting a signal power of transmission from the battery MMS to the WNC; and recording packet reception data during a second sampling period; and wherein determining a PER of the WNC for the at least one interference profile during the test includes determining a PER of the WNC for the first sampling period and determining a PER of the WNC for the second sampling period.
11. The apparatus of any of statements 8-10, wherein recording packet reception data for the WNC during the test is carried out while the battery MMS is rotated.
12. The apparatus of any of statements 8-11, further comprising computer program instructions that cause the apparatus to generate the at least one interference profile representing one or more interference signals for testing the BMS.
13. The apparatus of any of statements 8-12, where an orientation of the battery MMS within a battery pack is inverted such that an antenna of the battery MMS is oriented away from the WNC.
14. The apparatus of any of statements 8-13, wherein the at least one interference profile emulates a standard wireless communication protocol, and wherein the battery MMS and WNC utilize a non-standard wireless communication protocol.
15. A system for accelerated error testing for wireless battery management systems comprising: a battery management system (BMS) comprising: at least one battery module monitoring system (MMS) configured to transmit battery sensor data over a wireless communication link; and a wireless network controller (WNC) configured to receive the battery sensor data from the at least one battery MMS; and a test unit for testing the BMS, the test system configured to: provide at least one interference profile representing one or more interference signals for testing a battery management system (BMS), wherein the BMS includes a wireless network controller (WNC) and at least one battery module monitoring system (MMS); broadcast, during a test of the BMS, the one or more interference signals generated from the at least one interference profile; record packet reception data for the WNC during the test; and determine a packet error rate (PER) of the WNC for the at least one interference profile during the test.

16. The system of statement 15, wherein recording packet reception data for the WNC during the test includes: recording packet reception data during a first sampling period; adjusting a signal power of the one or more interference signals; and recording packet reception data during a second sampling period; and wherein determining a PER of the WNC for the at least one interference profile during the test includes determining a first PER of the WNC for the first sampling period and determining a second PER of the WNC for the second sampling period.

17. The system of statements 15 or 16, wherein recording packet reception data for the WNC during the test includes: recording packet reception data during a first sampling period; adjusting a signal power of transmission from the battery MMS to the WNC; and recording packet reception data during a second sampling period; and wherein determining a PER of the WNC for the at least one interference profile during the test includes determining a PER of the WNC for the first sampling period and determining a PER of the WNC for the second sampling period.

18. The system of any of statements 15-17, wherein the system further comprises a rotatable test platform for rotating the battery MMS while the test is carried out.

19. The system of any of statements 15-18, wherein the test unit is further configured to generate the at least one interference profile representing one or more interference signals for testing the BMS.

20. The system of any of statements 15-19, where an orientation of the battery MMS within a battery pack is inverted such that an antenna of the battery MMS is oriented away from the WNC.

Exemplary embodiments of the present disclosure are described largely in the context of a fully functional devices for testing a battery management system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure may be a system, an apparatus, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of accelerated error testing for wireless battery management systems, the method comprising:
    providing at least one interference profile representing one or more interference signals for testing a battery management system (BMS), wherein the BMS includes a wireless network controller (WNC) and at least one battery module monitoring system (MMS) configured for wireless communication with the WNC;
    broadcasting, during a test of the BMS, the one or more interference signals generated from the at least one interference profile;
    recording packet reception data for the WNC during the test, wherein the packet reception data is based on packets wirelessly received by the WNC from the battery MMS; and
    determining, based on the packet reception data, a packet error rate (PER) of the WNC for the at least one interference profile during the test.

2. The method of claim 1 wherein recording packet reception data for the WNC during the test includes:
    recording packet reception data during a first sampling period;
    adjusting a signal power of the one or more interference signals; and
    recording packet reception data during a second sampling period; and
    wherein determining a PER of the WNC for the at least one interference profile during the test includes determining a first PER of the WNC for the first sampling period and determining a second PER of the WNC for the second sampling period.

3. The method of claim 1, wherein recording packet reception data for the WNC during the test includes:
   recording packet reception data during a first sampling period;
   adjusting a signal power of transmission from the battery MMS to the WNC; and
   recording packet reception data during a second sampling period; and
   wherein determining a PER of the WNC for the at least one interference profile during the test includes determining a PER of the WNC for the first sampling period and determining a PER of the WNC for the second sampling period.

4. The method of claim 1, wherein recording packet reception data for the WNC during the test includes rotating the battery MMS during the test.

5. The method of claim 1 further comprising generating the at least one interference profile representing one or more interference signals for testing the BMS.

6. The method of claim 1, where an orientation of the battery MMS within a battery pack is inverted such that an antenna of the battery MMS is oriented away from the WNC.

7. The method of claim 1, wherein the at least one interference profile emulates a standard wireless communication protocol, and wherein the battery MMS and WNC utilize a non-standard wireless communication protocol.

8. An apparatus for accelerated error testing for wireless battery management systems, the apparatus comprising a computer processor, a computer memory operatively coupled to the computer processor, wherein within the computer memory are disposed computer program instructions that, when executed by the computer processor, cause the apparatus to:
   provide at least one interference profile representing one or more interference signals for testing a battery management system (BMS), wherein the BMS includes a wireless network controller (WNC) and at least one battery module monitoring system (MMS) configured for wireless communication with the WNC;
   broadcast, during a test of the BMS, the one or more interference signals generated from the at least one interference profile;
   record packet reception data for the WNC during the test, wherein the packet reception data is based on packets wirelessly received by the WNC from the battery MMS; and
   determine, based on the packet reception data, a packet error rate (PER) of the WNC for the at least one interference profile during the test.

9. The apparatus of claim 8 wherein recording packet reception data for the WNC during the test includes:
   recording packet reception data during a first sampling period;
   adjusting a signal power of the one or more interference signals; and
   recording packet reception data during a second sampling period; and
   wherein determining a PER of the WNC for the at least one interference profile during the test includes determining a first PER of the WNC for the first sampling period and determining a second PER of the WNC for the second sampling period.

10. The apparatus of claim 8, wherein recording packet reception data for the WNC during the test includes:
   recording packet reception data during a first sampling period;
   adjusting a signal power of transmission from the battery MMS to the WNC; and
   recording packet reception data during a second sampling period;
   wherein determining a PER of the WNC for the at least one interference profile during the test includes determining a PER of the WNC for the first sampling period and determining a PER of the WNC for the second sampling period.

11. The apparatus of claim 8, wherein recording packet reception data for the WNC during the test is carried out while the battery MMS is rotated.

12. The apparatus of claim 8 further comprising computer program instructions that cause the apparatus to generate the at least one interference profile representing one or more interference signals for testing the BMS.

13. The apparatus of claim 8, where an orientation of the battery MMS within a battery pack is inverted such that an antenna of the battery MMS is oriented away from the WNC.

14. The apparatus of claim 8, wherein the at least one interference profile emulates a standard wireless communication protocol, and wherein the battery MMS and WNC utilize a non-standard wireless communication protocol.

15. A system for accelerated error testing for wireless battery management systems comprising:
   a battery management system (BMS) comprising:
      at least one battery module monitoring system (MMS) configured to transmit battery sensor data over a wireless communication link;
      and a wireless network controller (WNC) configured to receive the battery sensor data from the at least one battery MMS; and
   a test unit for testing the BMS, the test system configured to:
      provide at least one interference profile representing one or more interference signals for testing a battery management system (BMS);
      broadcast, during a test of the BMS, the one or more interference signals generated from the at least one interference profile;
      record packet reception data for the WNC during the test, wherein the packet reception data is based on packets wirelessly received by the WNC from the battery MMS; and
      determine, based on the packet reception data, a packet error rate (PER) of the WNC for the at least one interference profile during the test.

16. The system of claim 15 wherein recording packet reception data for the WNC during the test includes:
   recording packet reception data during a first sampling period;
   adjusting a signal power of the one or more interference signals; and
   recording packet reception data during a second sampling period; and
   wherein determining a PER of the WNC for the at least one interference profile during the test includes determining a first PER of the WNC for the first sampling period and determining a second PER of the WNC for the second sampling period.

17. The system of claim 15, wherein recording packet reception data for the WNC during the test includes:
   recording packet reception data during a first sampling period;
   adjusting a signal power of transmission from the battery MMS to the WNC; and recording packet reception data during a second sampling period; and wherein determining a PER of the WNC for the at least one interference profile during the test includes determining a PER of the WNC for the first sampling period and determining a PER of the WNC for the second sampling period.

18. The system of claim 15, wherein the system further comprises a rotatable test platform for rotating the battery MMS while the test is carried out.

19. The system of claim 15, wherein the test unit is further configured to generate the at least one interference profile representing one or more interference signals for testing the BMS.

20. The system of claim 15, where an orientation of the battery MMS within a battery pack is inverted such that an antenna of the battery MMS is oriented away from the WNC.

\* \* \* \* \*